June 4, 1940. M. RUBINOFF Re. 21,477

SEALED TAG

Original Filed May 31, 1939

INVENTOR
MARK RUBINOFF
BY
Carl Miller
ATTORNEY

Reissued June 4, 1940

Re. 21,477

UNITED STATES PATENT OFFICE 21,477

SEALED TAG

Mark Rubinoff, New York, N. Y.

Original No. 2,178,810, dated November 7, 1939, Serial No. 276,596, May 31, 1939. Application for reissue January 20, 1940, Serial No. 314,892

6 Claims. (Cl. 40—21)

This invention relates to sealed tags, and is particularly directed to a tag provided with a loop which cannot be removed without destroying the seal.

An object of this invention is to provide an article of the character described, in which the loop may be passed through an opening in an article to which the tag is to be attached, the loop being provided with terminals which may be inserted into the seal on the tag, and thereafter, cannot be removed without destroying either the loop or the seal.

Another object of this invention is to provide a sealed tag of the character described, and a pair of wires each having a terminal which may be inserted into the seal, and which cannot be removed therefrom, and means for attaching the free ends of the wires together and to a bag in such a way that the tag cannot be removed from the bag without destroying the seal or injuring the tag.

A further object is to provide a sealed tag of a novel and improved construction, in which the seal is in the form of a disk embossed to a relatively shallow depth, said disk being adapted to be applied directly against the surface of and secured to the tag in a permanent manner, so as to provide the tag with an enclosure of which the tag itself forms a part; said enclosure being provided with an opening or openings through which the anchoring terminals of an attaching loop may be inserted to be non-removably retained within said enclosure.

An additional object is to provide, in a device of the character specified, a seal of a simple and inexpensive construction adapted to be applied to a tag without altering either the width or the length of said tag, so that the complete device will be a tag of standard dimensions requiring virtually no change in present methods of and means for producing, packing and shipping the tags.

Yet another object of this invention is to provide a strong, rugged and durable seal of the character described, which shall be relatively inexpensive to manufacture, and yet practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described, and of which the scope of application will be indicated in the following claims.

In the accompanying drawing, in which is shown various possible illustrative embodiments of this invention, Fig. 1 is a top plan view of a sealed tag embodying the invention, showing one terminal of the loop within the seal and one outside of the seal;

Figure 2:
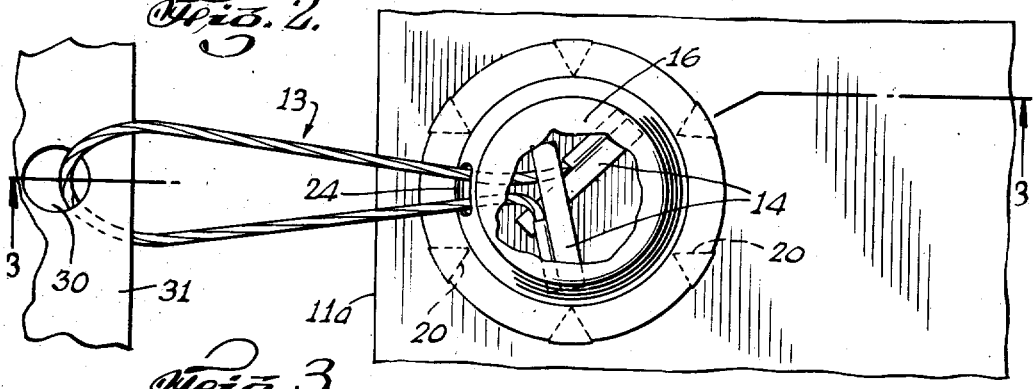
Fig. 2 is an enlarged top plan view of the sealed tag with the loop passing through an opening in the article to which the tag is attached, and with parts broken away.
Figure 3:
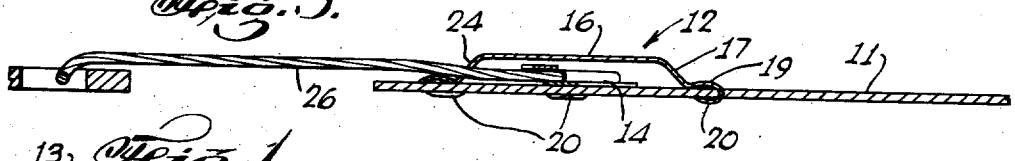
Fig. 3 is a cross-sectional view taken on line 3—3 of Fig. 2.
Figure 1:
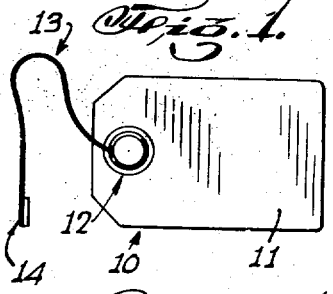
Figure 4:
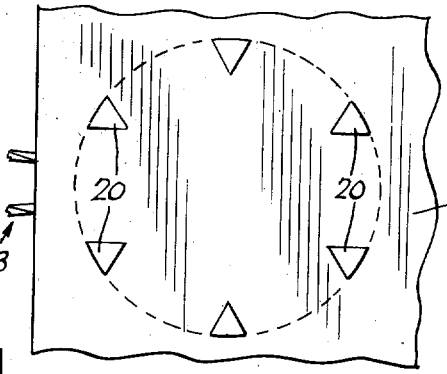
Fig. 4 is a bottom plan view of the tag showing the prongs of the seal engaging the tag.

Referring now in detail to the drawing, 10 designates a sealed tag embodying the invention, and comprising generally of a tag 11 which may be made of paper, cloth, cardboard or the like sheet material, a seal 12 attached thereto, and a loop 13 provided with terminals 14 which are adapted to be inserted into the seal, in the manner hereinafter appearing.

The seal 12 is shown in the form of a pronged sheet metal disk embossed to a relatively shallow depth to form a depressed chamber provided with a pronged peripheral flange, said chamber having an annular wall 17 and a bottom 16 forming the top wall of the enclosure when said seal is set against the tag with its flange contacting the surface of said tag. Extending from the periphery of the flange 19 are a plurality of equiangularly spaced pointed prongs 20, piercing the tag 11 and bent inwardly against the underside of said tag.

In the drawing, the seal is shown to be provided with six prongs, it being understood however that any number of prongs may be provided.

The seal 12 may be located adjacent one end edge 11*a* of the tag 11. The annular wall 17, which is preferably slightly tapered for convenience in manufacture, is formed adjacent said end edge with a small slot 24, for the purpose hereinafter appearing.

The loop 13 comprises a flexible cord, string or wire 26, to the outer ends of which are attached the terminals 14. Each terminal 14 may comprise a piece of oblong shaped metal having a slot along its longitudinal axis extending half way the length of said piece of metal. The end of the string 26 passes through the slot, and the piece of metal is folded over its longitudinal axis to grip the string.

With this construction, the terminal extends at right angles to the string and the string emerges from the mid portion of the terminal. The terminal members may be inserted through the opening 24 into the seal, but after insertion, cannot be removed. The string is passed through an opening 30 in a sheet 31, or may be passed through a buttonhole. In this manner the tag may be attached to any article through which the string may be passed. It will now be understood that the string cannot be removed from the tag, and the seal cannot be opened without tearing the tag.

Obviously, the tag 11 may be in the form of a calendar and may be of any color. In fact, the seal may be attached to any sheet, such as a bookcover.

Figure 5:
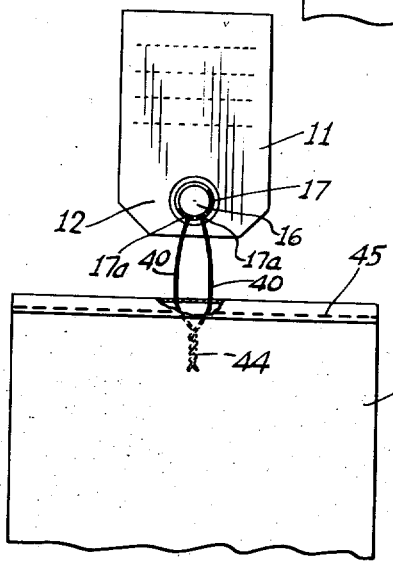
Fig. 5 is a top plan view of a sealed tag embodying the invention, attached to a bag.

In Fig. 5 the tag 11 is provided with a seal 12. The annular wall 17, however, is formed with a pair of small openings 17a located close to each other, and into each of which is inserted the terminal 14 of a piece of wire 40. The outer ends of the piece of wire may be passed into the open end of a bag 43 and twisted together, as at 44. The open end of the bag may then be stitched, as at 45, so that the wires 40 cannot be removed.

Figure 6:
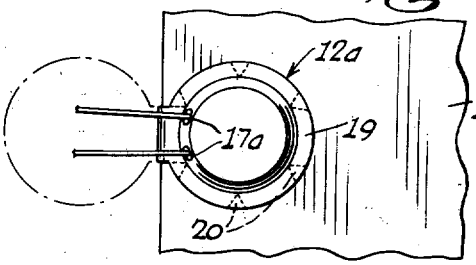
Fig. 6 is a top plan view of a seal tag embodying the invention, and illustrating a modified construction.
Figure 7:
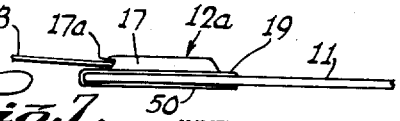
Fig. 7 is a side elevational view of the structure shown in Fig. 6.

In Figs. 6 and 7 there is illustrated a still further modified construction. The seal 12a of Figs. 6 and 7 is similar to the seal 12, with the exception that there extends from the flange 19, a circular tab 50 which may be bent underneath the tag 11 to cover the prongs 20. The seal 12a may be formed also with a pair of openings 17a, similar to the openings 17a of the seal shown in Fig. 5 to receive the terminals of a loop 13.

It will be observed that the seal is of an exceedingly simple and inexpensive construction, and that the tag itself is utilized to complete, with the seal, the enclosure retaining the anchoring ends of the string or loop. In view of the fact that the seal is applied directly against the surface of the tag, the overall dimensions of the tag itself are not altered. This is a detail of practical importance in that no changes are required in the production of the tags and of the packing and shipping containers therefor as now generally in use. Furthermore, the shallowness of the seal itself does not affect the packing thickness of the sealed tag to an objectionable extent.

It will be further observed that the simple application of the seal to the tag is sufficient to produce the device in complete form, requiring no additional sealing means in order to form a means for non-removably retaining the anchoring ends of the wire or loop.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a sheet and a seal having a top wall, parallel and spaced above the sheet, a downwardly and outwardly tapered wall extending from said top wall toward said sheet, a flange extending from the lower end of said tapered wall and contacting the top of said sheet, and prongs extending from the outer edge of said flange piercing the sheet and bent inwardly against the underside of the sheet, said tapered wall being formed with an opening, a string passing through said opening and providing a loop having terminals at the outer ends thereof extending transversely of the ends of said string and disposed within the seal, and said loop passing through said opening, said terminals being adapted to be passed into the seal through said opening, but not being adapted to be removed from said seal.

2. In combination with a sheet, a seal comprising a member having a flat annular wall spaced parallel to and above said sheet, a downwardly and outwardly tapered wall extending from said top wall, an outwardly extending annular flange extending from the lower end of said tapered wall, a plurality of equiangularly spaced prongs extending from said flange and piercing said tag, and bent inwardly against the undersurface of said tag, said tapered wall being formed with an opening, and a looped shackle having the free ends thereof passing through said opening, and terminals fixed to the ends of said shackle and extending at right angles thereto.

3. A device of the character described comprising a continuously integral sheet and a seal abutting directly against the surface of said sheet, said seal consisting of a recessed disk forming with the surface of said sheet a relatively shallow closed chamber raised therefrom, said disk having an opening in its wall adapted for the insertion of a fastening device therethrough, and having a plurality of pointed prongs passing through perforations in said sheet and bent against the opposite surface thereof, securing said seal to said sheet so as to be virtually non-detachable therefrom.

4. In a device of the character described, a sheet and a seal abutting directly against the surface of and permanently attached to said sheet, said sheet extending continuously over and overlying the entire area of the seal, said seal consisting of a recessed disk and cooperating with said overlying sheet portion to form a relatively shallow, closed chamber raised therefrom, said disk having an opening in its wall adapted for the insertion of a fastening device therethrough.

5. In a device of the character described, a sheet, a seal abutting directly against the surface of and permanently attached to said sheet, said sheet extending continuously over and overlying the entire area of the seal, said seal consisting of a recessed disk and cooperating with said overlying sheet portion to form a relatively shallow, closed chamber raised therefrom, said disk having an opening in its wall, and a fastening loop having at least one of its ends provided with a terminal adapted for insertion through said opening for permanent interlocking with said seal.

6. In combination, a sheet and a seal consisting of a recessed disk having a peripheral flange abutting directly against the surface of and permanently attached to said sheet, said sheet extending continuously over and overlying the entire area of the seal, the recessed portion of said disk having a top wall and a peripheral wall, forming with said overlying sheet portion, a relatively shallow chamber raised therefrom, said disk having an opening through said peripheral wall, and a fastening loop having at least one of its ends provided with a terminal adapted for insertion through said opening for permanent interlocking with said seal.

MARK RUBINOFF.